United States Patent [19]

Iizuka et al.

[11] Patent Number: 5,086,894
[45] Date of Patent: Feb. 11, 1992

[54] LOCK-UP CLUTCH CONTROL SYSTEM FOR AUTOMATIC POWER TRANSMISSION

[75] Inventors: Nanori Iizuka; Takafumi Kurata, both of Shizuoka, Japan

[73] Assignee: Jatco Corporation, Shizuoka, Japan

[21] Appl. No.: 578,197

[22] Filed: Sep. 6, 1990

[30] Foreign Application Priority Data

Sep. 9, 1989 [JP] Japan .................................. 1-234425

[51] Int. Cl.$^5$ ............................................. F16D 33/00
[52] U.S. Cl. .................... 192/3.29; 192/3.31; 192/3.33; 192/0.032
[58] Field of Search ............ 192/3.29, 3.3, 3.31, 192/3.33, 0, 0.32, 0.076

[56] References Cited

U.S. PATENT DOCUMENTS

| | | | |
|---|---|---|---|
| 4,490,122 | 7/1990 | Fujieda | 192/0.032 X |
| 4,577,737 | 3/1986 | Niikura et al. | 192/0.032 |
| 4,582,185 | 4/1986 | Grimes et al. | 192/0.076 |
| 4,732,245 | 3/1988 | Hiramatsu | 192/3.3 X |
| 4,880,091 | 11/1989 | Hasegawa et al. | 192/3.29 X |
| 4,966,263 | 10/1990 | Hayasaki | 192/3.3 |

FOREIGN PATENT DOCUMENTS

| | | |
|---|---|---|
| 95132 | 11/1983 | European Pat. Off. ......... 192/0.032 |
| 61-119870 | 6/1986 | Japan . |
| 61-206868 | 9/1986 | Japan . |
| 1-69858 | 3/1989 | Japan . |
| 1-112074 | 4/1989 | Japan . |

OTHER PUBLICATIONS

Patent Abstracts of Japan, vol. 13, No. 267 (M-840), Jun. 20, 1989, and JP 1-69859 (Mazda) Mar. 15, 1989.
Patent Abstracts of Japan, vol. 10, No. 307 (M-527), Oct. 18, 1986, and JP 61-119870 (Toyota) Jun. 7, 1986.
Patent Abstracts of Japan, vol. 13, No. 334 (M-855), Jul. 27, 1989, and JP 1-112074 (Mazda) Apr. 28, 1989.

*Primary Examiner*—Leslie A. Braun
*Assistant Examiner*—Andrea Pitts
*Attorney, Agent, or Firm*—Ronald P. Kananen

[57] ABSTRACT

A lock-up clutch control system for an automatic power transmission includes a torque converter mode, a full lock-up mode and a clip lock-up mode for controlling operation of a lock-up clutch which is disposed between a pump impeller and a turbine runner of a torque converter. The slip lock-up mode is a transitional mode between the torque converter mode and the full lock-up mode and connects the pump impeller and the turbine runner such that a relative rotation therebetween is allowed. In the system, one of the above-noted three modes is selected based on preselected vehicular operating condition indicative parameters, such as, an engine load and a vehicle speed. When a rapid depression of an accelerator pedal by a driver is detected after the slip lock-up mode is selected, the torque converter mode is executed in place of the slip lock-up mode until the rapid depression of the accelerator pedal is not detected.

20 Claims, 3 Drawing Sheets

LOCK-UP CLUTCH CONTROL SYSTEM FOR AUTOMATIC POWER TRANSMISSION

BACKGROUND OF THE INVENTION

1. Field of the Invention

The present invention relates generally to a lock-up clutch control system for an automatic power transmission for an automotive vehicle. More specifically, the present invention relates to a lock-up clutch control system for a fluidly operated power transmission unit used in an automatic automotive power transmission, wherein a required response of vehicular acceleration can be provided even when a slip lock-up control of the fluidly operated power transmission unit is performed.

2. Description of the Background Art

One of previously proposed lock-up clutch control systems is exemplified for example, by Japanese First Patent Publication No. 61-206868 published on Sept. 13, 1986.

In the system of this publication, a torque converter is selectively operated under a torque converter mode, a slip lock-up mode and a full lock-up mode according to a predetermined control schedule which is determined in terms of an engine load and a vehicle speed. In the torque converter mode, a turbine runner is hydraulically operated by the movement of a pump impeller, while, in the full lock-up mode, the pump impeller is directly and mechanically connected to the turbine runner through a lock-up clutch. The slip lock-up mode is a half-clutch mode or a transitional mode for smoothly shifting from the torque converter mode to the full lock-up mode.

In the above-noted background system, however, even if an accelerator pedal is depressed to accelerate the vehicle during the slip lock-up mode, the slip lock-up mode continues according to the above-noted control schedule. Since the slip lock-up mode is the half-clutch mode where the slip is permitted with the lock-up clutch being half engaged, this becomes a load to the engine to prevent an engine speed from increasing so that an acceleration response corresponding to the operation of the accelerator pedal is not attained.

SUMMARY OF THE INVENTION

Therefore, it is an object of the present invention to provide a lock-up clutch control system for an automatic automotive power transmission that can eliminate the above-noted defects inherent in the background art.

It is another object of the present invention to provide a lock-up clutch control system for an automatic automotive power transmission that provides a required acceleration response when the vehicular acceleration is demanded after the slip lock-up mode is selected.

To accomplish the above-mentioned and other objects, according to one aspect of the present invention, a lock-up clutch control system for an automatic power transmission comprises:

an input element in drive connection with a prime mover;

an output element in drive connection with a gear train, the output element being adapted to be driven by the input member through working fluid;

a lock-up clutch operatively arranged between the input element and the output element, the lock-up clutch being operated in one of first to third modes, the lock-up clutch being applied to fully connect the input element with the output element in the first mode and being released to fully disconnect the input element from the output element in the second mode and being applied to connect the input element with the output element in the third mode such that a relative rotation is allowed between the input and output elements;

first means for selecting one of the first to third modes based on preselected vehicular operating condition indicative parameters;

second means for deriving an acceleration demand magnitude when the third mode is selected by the first means;

third means for executing the second mode in place of the third mode when the acceleration demand magnitude is no less than a predetermined value.

BRIEF DESCRIPTION OF THE DRAWINGS

The present invention will be understood more fully from the detailed description given hereinbelow and from the accompanying drawings of the preferred embodiment of the invention, which are given by way of example only, and are not intended to be limitative of the present invention.

In the drawings.

DESCRIPTION OF THE PREFERRED EMBODIMENT

Figure 1:
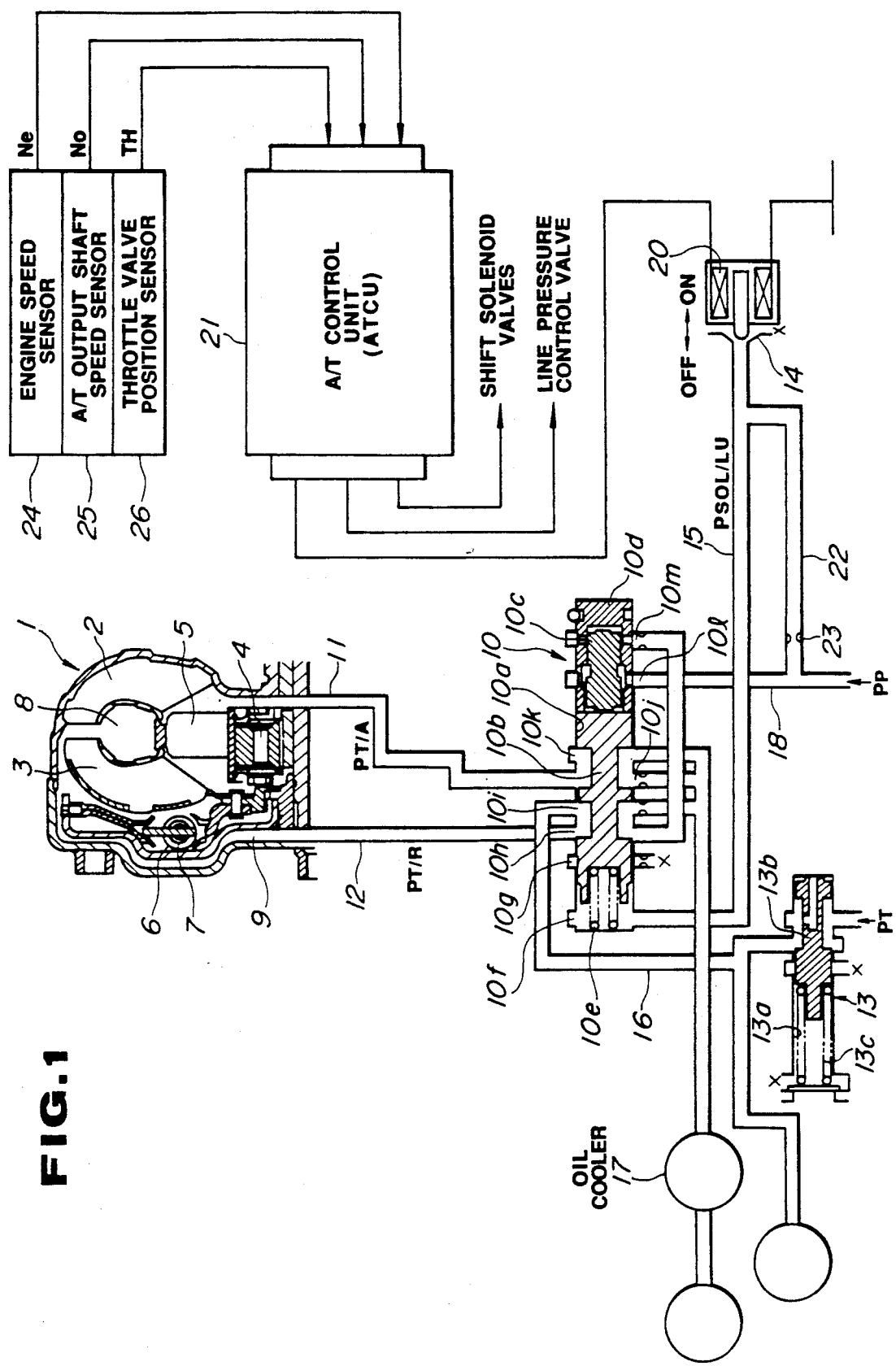
FIG. 1 shows a lock-up control system for an automatic automotive power transmission according to a preferred embodiment of the present invention.

Referring now to the drawings, a preferred embodiment of a lock-up clutch control system for an automotive automatic power transmission according to the present invention will be described with reference to FIGS. 1 to 4.

In FIG. 1, a fluidly operated power transmission unit, such as, a torque converter 1 is operatively connected with a prime mover such as an internal combustion engine (not shown) and includes a pump impeller 2 (input element), a turbine runner 3 (output element), a one-way clutch 4, and a stator 5 which is operatively connected to a casing by way of the one-way clutch 4. The pump impeller 2 and the turbine runner 3 are arranged to be selectively connected by a lock-up clutch 6. When the lock-up clutch 6 is released, i.e. the pump impeller 2 and the turbine runner 3 are not connected by the lock-up clutch 6 (torque converter mode), the turbine runner 3 is hydraulically driven by the movement of the pump impeller 2 which is driven by the internal combustion engine. On the other hand, when the lock-up clutch 6 is fully engaged or applied, i.e. the pump impeller 2 and the turbine runner 3 are fully connected by the lock-up clutch 6 (full lock-up mode), the turbine runner 3 ie mechanically driven by the movement of the pump impeller 2. Further, when the lock-up clutch is half applied, the pump impeller 2 and the turbine runner 3 are connected by the lock-up clutch 6 in a fashion to allow a small slip or relative displacement between the pump impeller 2 and the turbine runner 3 (slip lock-up mode). A clutch damper 7 which includes a torsion spring is operatively interposed between the turbine runner 3 and the lock-up clutch 6 in order to attenuate large torque fluctuations which tend to occur during the full lock-up mode.

The lock-up clutch control system further includes a lock-up clutch apply chamber 8 (hereinafter referred to as apply chamber) and a lock-up clutch release chamber 9 (hereinafter referred to as release chamber) of a thinly configured chamber arrangement. The apply chamber 8 is connected to a lock-up control valve 10 via an apply pressure conduit 11, and the release chamber 9 is connected to the lock-up control valve 10 via a release pressure conduit 12.

The lock-up control valve 10 selectively feeds an apply pressure $P_{T/A}$ into the apply pressure conduit 11 for applying the lock-up clutch 6 and a release pressure $P_{T/R}$ into the release pressure conduit 12 for releasing the lock-up clutch 6.

The system further includes a T/C relief valve 13 which regulates a torque converter pressure $P_T$ to a constant level, and a lock-up solenoid valve 14 which modulates a supply of a pilot pressure $P_P$ to form a solenoid pressure $P_{SOL/LU}$ in response to an externally applied duty signal.

The operation of the lock-up control valve 10 is controlled by the solenoid pressure $P_{SOL/LU}$ applied thereto to selectively feed the torque converter pressure $P_T$ into the apply pressure conduit 11 as the apply pressure $P_{T/A}$ for applying the lock-up clutch 6 and into the release pressure conduit 12 as the release pressure $P_{T/R}$ for releasing the lock-up clutch 6. Specifically, the lock-up control valve 10 includes a bore 10a in which a valve spool 10b is reciprocatively disposed and subject to a bias by a spring 10c. The bore 10a further includes therein a fixed sleeve 10d in which a control plug 10c is reciprocatively disposed facing one end of the valve spool 10b. The bore 10a is formed with control ports 10f to 10m. The control port 10f is connected to the lock-up solenoid valve 14 via a solenoid pressure conduit 15 for receiving the solenoid pressure $P_{SOL/LU}$. The control port 10g is used as a drain port, the control port 10h communicates at its one side with the release pressure conduit 12 and with the control port 10m at its other side, the control port 10i communicates at its one side with a torque converter pressure conduit 16 into which the torque converter pressure $P_T$ is fed through the relief valve 13 and with an oil cooler 17 at its other side, the control port 10j communicates at its one side with the apply pressure conduit 11 and with the oil cooler 17 at its other side, the control port 10k communicates with the oil cooler 17, and the control port 10l is constantly fed with the pilot pressure $P_P$ through a pilot pressure conduit 18.

The relief valve 13 includes a valve bore 13a in which a valve spool 13b and a spring 13c are disposed. As will be readily appreciated, when the bias produced by the torque converter pressure $P_T$ exceeds that produced by the spring 13c, a drain port is opened to relief the excess to supply the constant pressure $P_T$ into the conduit 16.

The lock-up solenoid valve 14 is arranged so that when a solenoid 20 is de-energized (OFF) in response to a drive signal having a zero duty cycle which is fed from an automatic transmission control unit (ATCU) 21, to shut off the solenoid valve 14, the pilot pressure $P_P$ introduced into the solenoid pressure conduit 15 via a conduit 22 through an orifice 23 is prevented from draining through the solenoid valve 14. Accordingly, the pilot pressure $P_P$ is applied to the control port 10f as the solenoid pressure $P_{SOL/LU}$. As a result, the valve spool 10b is biased to the right in FIG. 1 by a combined force of the pilot pressure $P_P$ (solenoid pressure $P_{SOL/LU}$) and the spring force to be positioned as shown in FIG. 1 where the drain port 10g is shut off to apply the torque converter pressure $P_T$ to the release chamber 9 as the release pressure $P_{T/R}$ via the release pressure conduit 12. Thus, the lock-up clutch 6 is controlled to be in the released position to provide the torque converter mode. On the other hand, when the solenoid 20 is energized (ON) in response to the drive signal having a 100% duty cycle to open the solenoid pressure conduit 15, the pilot pressure $P_P$ introduced into the solenoid pressure conduit 15 via the conduit 22 through the orifice 23 is drained through the solenoid valve 14. Accordingly, no solenoid pressure $P_{SOL/LU}$ is applied to the control port 10f. As a result, the valve spool 10b is biased to the left in FIG. 1 by a combined force of the pilot pressure $P_P$ applied to the control plug 10c via the control port 10l and the torque converter pressure $P_T$ applied to the control plug 10c via the control port 10m to open the drain port 10g and to connect the torque converter pressure conduit 16 with the apply pressure conduit 11 via the control ports 10i and 10j. Accordingly, the torque converter pressure $P_T$ is applied to the apply chamber 8 as the apply pressure $P_{T/A}$ while no pressure is applied to the release chamber 9 via the release pressure conduit 12. As a result, the lock-up clutch 6 is controlled to be in the applied position to provide the full lock-up mode. It is to be appreciated that after the drain port 10g is opened, no pressure is applied to the control port 10m. Accordingly, the pilot pressure $P_P$ is set larger than the bias force of the spring 10e to retain the valve spool 10b in the position to open the drain port 10g.

As appreciated, by controlling the duty cycle of the drive signal, the solenoid pressure $P_{SOL/LU}$ fed to the control port 10f is controlled to be a desired level to provide the slip lock-up mode.

The ATCU 21 receives data inputs from a plurality of sensors, such as, an engine speed sensor 24 for yielding a signal indicative of an engine speed Ne, a transmission output shaft rotational speed sensor 25 for yielding a signal indicative of a transmission output shaft speed No (vehicle speed) and a throttle valve position sensor 26 for yielding a signal indicative of a throttle valve opening degree TH. The sensor signals are fed to the ATCU which processes those sensor signals according to stored programs. The stored programs include, for example, a shift control program for controlling operations of shift solenoid valves (not shown) and a line pressure control program for controlling operations of a line pressure control solenoid valve. The stored programs further includes a lock-up control program for controlling the operations of the lock-up clutch 6 to provide the torque converter mode (full released mode), the slip lock-up mode or the full lock-up mode according to a predetermined lock-up control schedule, such as, shown in FIG. 4 which can be used, for example, following a 3–4 upshift, to determine which mode should be implemented and when. As described above, the ATCU 21 controls the operations of the lock-up clutch 6 by controlling the duty cycle of the drive signal to be fed to the lock-up solenoid valve 20.

Figure 2:
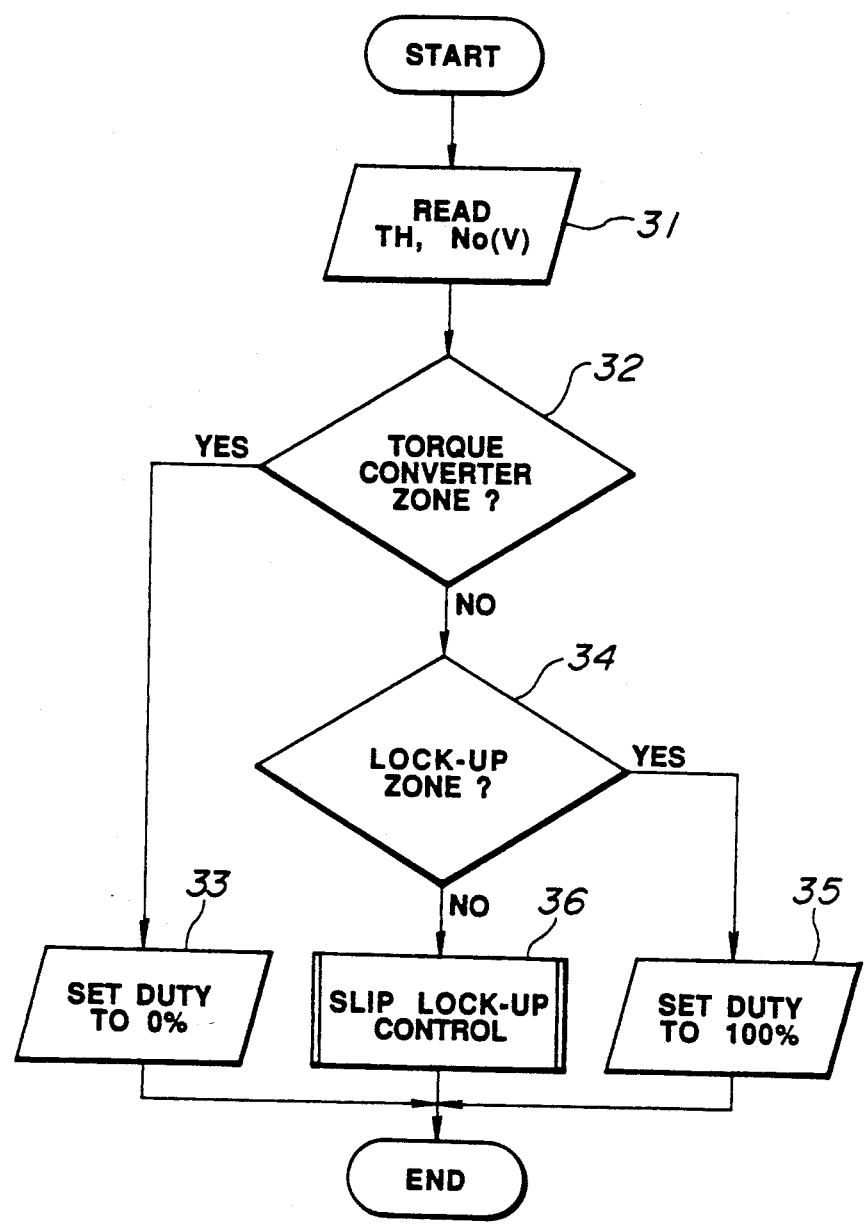
FIG. 2 is a flowchart showing a main routine to be executed by an A/T control unit in the preferred embodiment of FIG. 1 for controlling operation of a lock-up clutch.

FIG. 2 shows a flowchart of a main routine of the above-noted lock-up control program to be executed by the ATCU 21.

At a first step 31, a throttle valve opening degree TH indicative of an engine load condition and a transmission output shaft speed No indicative of a vehicle speed V are read. Subsequently, at a step 32, these data are used to determine what lock-up clutch condition is required according to the lock-up control schedule of FIG. 4. Specifically, at the step 32, it is decided whether the torque converter mode (full released mode) is required or not, i.e. whether a vehicle operating condition determined in terms of the engine load and the vehicle speed is within the torque converter mode. If a decision at the step 32 is YES, i.e. the torque converter mode is required, then the routine goes to a step 33 where the duty cycle is set to 0%. Accordingly, the lock-up solenoid valve 20 is retained in the OFF position to shut off the solenoid valve 14 to provide the torque converter mode of the lock-up clutch 6.

On the other hand, if the decision at the step 32 is NO, i.e. the torque converter mode is not required, then the routine proceeds to a step 34 where the data read out at the step 31 are used to determine whether the full lock-up mode is required. If a decision at the step 34 is YES, i.e. the full lock-up mode is required, then the routine goes to a step 35 where the duty cycle of the drive signal is set to 100%. Accordingly, the lock-up solenoid valve 20 is retained in the ON position to open the solenoid pressure conduit 15 to provide the full lock-up mode of the lock-up clutch 6.

Figure 3:
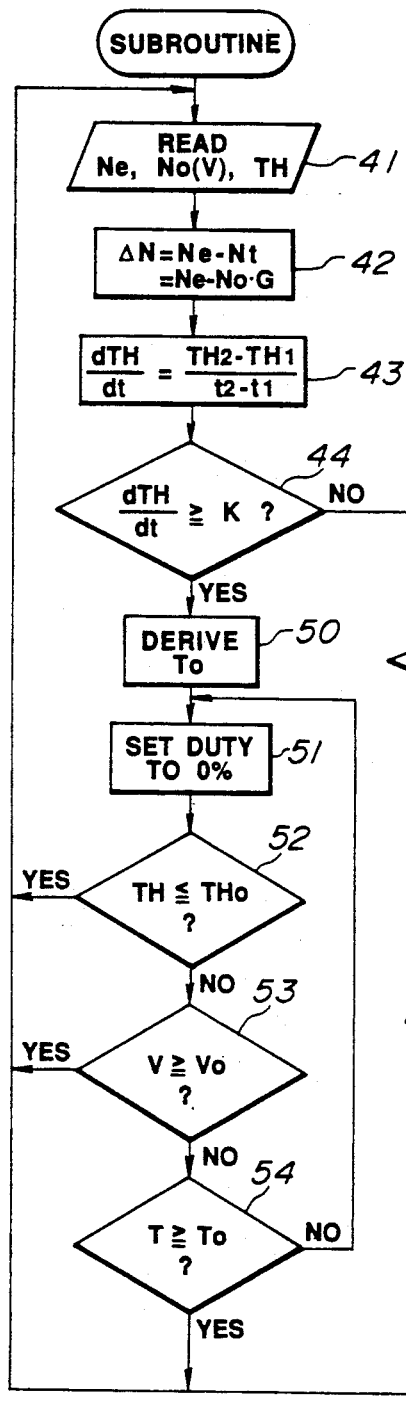
FIG. 3 is a flowchart showing a subroutine for controlling a slip lock-up mode.

On the other hand, if the decision at the step 34 is NO, i.e. the full lock-up mode is not required, then the routine goes to a step 36 where a subroutine shown in FIG. 3 is executed for controlling the slip lock-up mode.

At a first step of the subroutine, an engine speed Ne, a transmission output shaft speed No (vehicle speed V) and a throttle valve opening degree TH are read. Subsequently, at a step 42, a slip amount $\Delta N$ is derived using the following equation:

$$\Delta N = Ne - Nt$$
$$= Ne - No \times G$$

where, Nt denotes a rotational speed of the turbine runner 3, and G denotes an instant gear ratio of the automatic power transmission.

Subsequently, at a step 43, a speed of variation in a throttle valve angular position (dTH/dt) indicative of an accelerator operating speed or a vehicular acceleration demand magnitude is derived using a following equation:

$$dTH/dt = (TH_2 - TH_1)/(t_2 - t_1)$$

where, $(TH_2 - TH_1)$ denotes a variation in a throttle valve opening degree TH read out at the step 41, and $(t_2 - t_1)$ denotes a time required for that variation.

Subsequently, at a step 44, dTH-dt derived at the step 43 is compared with a preset value K. Specifically, the step 44 decides whether dTH/dt is no less than the preset value K. If a decision at the step 44 is NO, i.e. dTH/dt is less than the preset value K, then the routine proceeds to a step 45 where it is decided whether the slip amount $\Delta N$ derived at the step 42 is within a predetermined range using a following inequality:

$$\Delta Ns - \alpha < \Delta N \leq \Delta Ns + \alpha$$

where, $\Delta Ns$ denotes a target slip amount, and $\alpha$ denotes a preset value.

If a decision at the step 45 is YES, i.e. the slip amount $\Delta N$ is within the predetermined range, then the routine goes to a step 46 where a duty cycle of the drive signal is held at a current value. On the other hand, if the decision at the step 45 is NO, i.e. the slip amount $\Delta N$ is out of the predetermined range, then the routine goes to a step 47 which decides whether the slip amount $\Delta N$ is larger than $\Delta Ns + \alpha$. If a decision at the step 47 is YES, i.e. the slip amount $\Delta N$ is larger than $\Delta Ns + \alpha$, then the routine goes to a step 48 where the duty cycle is increased to reduce the slip amount $\Delta N$ for bringing the slip amount $\Delta N$ into the predetermined range. On the other hand, if the decision at the step 47 is NO, i.e. the slip amount $\Delta N$ is no more than $\Delta Ns - \alpha$, then the routine proceeds to a step 49 where the duty cycle is reduced to increase the slip amount $\Delta N$ for bringing the slip amount $\Delta N$ into the predetermined range.

As appreciated, through the steps 45 to 49, the slip amount $\Delta N$ is maintained in the predetermined range via a feedback control to provide a desired slip lock-up mode.

Referring back to the step 44, if the decision at the step 44 is YES, i.e. dTH/dt is no less than the preset value K, then the routine proceeds to a step 50 where a timer value To is derived based on an instantaneous engine spees V (No), an instantaneous engine speed Ne and a current gear position GP. The derived timer value To determines a period of time in which the slip lock-up mode is released or suspended. For example, the timer value To is derived to be shorter as the vehicle speed V is larger, the throttle valve opening degree TH is smaller and the gear position GP is in a higher speed gear position.

Subsequently, at a step 51, the duty cycle of the drive signal is set to 0%. Accordingly, the slip lock-up mode is released and shifted to the torque converter mode. Thus, a required accelaration response is attained corresponding to the depression of the accelerator pedal, i.e. corresponding to the acceleration demand magnitude.

Subsequently, the routine goes to a step 52 where the instantaneous throttle valve opening degree TH read out at the step 41 is compared with a preset throttle valve opening degree THo. Specifically, the step 52 decides whether the instantaneous throttle valve opening degree TH is not greater than the present throttle angle THo. If a decision at the step 52 is YES, i.e. the instantaneous throttle valve opening degree TH is less than the preset value THo, then the routine returns to the step 41 to start the slip lock-up control subroutine before the derived timer value is reached. On the other hand, if the decision at the step 52 is NO, i.e. the instantaneous throttle valve opening degree TH is not less than the preset value THo, then the routine goes to a step 53 where it is decided whether the instantaneous vehicle speed V (No) is not less than a preset value Vo. If a decision at the step 53 is YES, i.e. the instantaneous vehicle speed V is not less than the preset value Vo, then the routine returns to the step 41 to start the slip lock-up control subroutine before the derived timer value is reached. On the other hand, if the decision at the step 53 is NO, i.e. the instantaneous vehicle speed V is less than the preset value Vo, then the routine proceeds to a step 54 where a time T counted by a timer commencing from a time point of the positive decision at the step 44 is compared with the timer value To derived at the step 50. Specifically, the step 54 decides whether the time T is not less than the derived timer value To. If a decision at the step 54 is YES, i.e. the time T is no less than the timer value To, then the routine returns to the step 41 to start the slip lock-up control subroutine. On the other hand, if the decision at the step 54 is NO, i.e. the time T is less than the timer value To, then the routine returns to execute the steps 51 to 54 until the decision at the step 52, 53 or 54 becomes positive.

As appreciated, in the preferred embodiment as described above, the following effects are derived.

(1) When a vehicle driver depresses the accelerator pedal rapidly during the slip lock-up mode, the decision at the step 44 becomes positive and the slip lock-up mode is suspended and shifted to the torque converter mode which is performed for a predetermined period of time derived at the step 50. Accordingly, the engine load is reduced to increase the engine speed corresponding to the depressing operation of the accelerator pedal. As a result, a required acceleration response corresponding to the acceleration demand magnitude is attained even when the vehicular operating condition in terms of the engine load and the vehicle speed falls in the slip lock-up zone.

Figure 4:
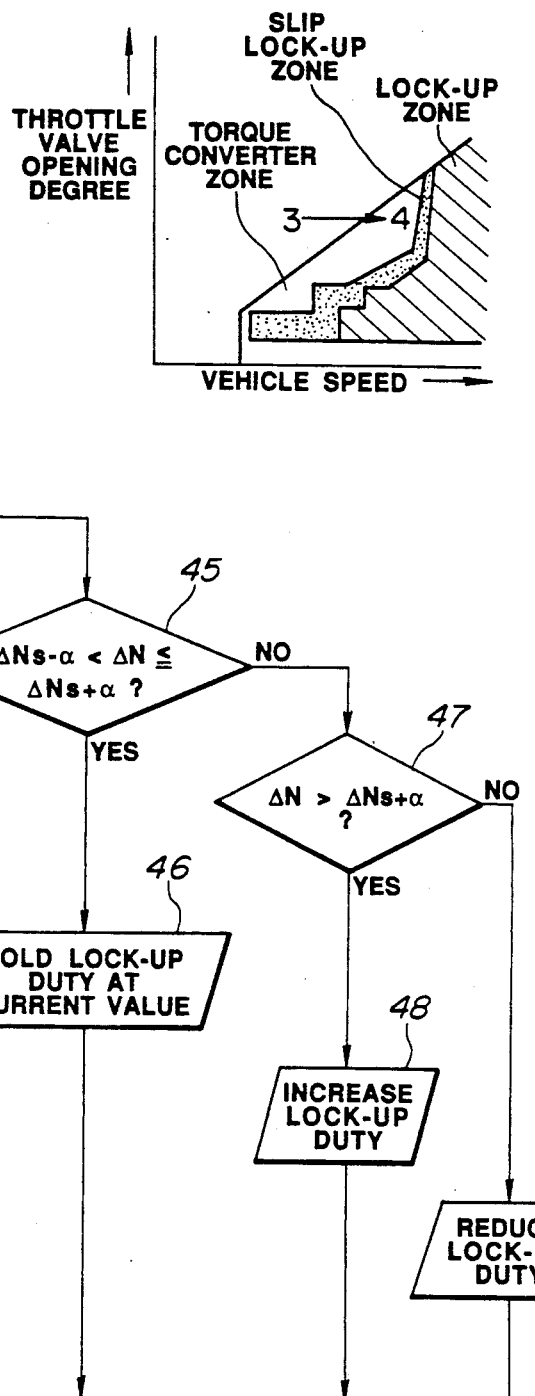
FIG. 4 is a graph showing a torque converter operation control schedule in terms of a vehicle speed and a throttle valve opening degree.

(2) Since the slip lock-up control subroutine is re-started before the time T reaches the timer value To when the decision at the step 52 or at the step 53 becomes positive, a direct shift from the torque converter mode to the full lock-up mode due to a delay in starting the slip lock-up mode is effectively prevented. Specifically, as shown in FIG. 4, when the throttle valve opening degree is smaller or the vehicle speed is larger, possibility is higher to shift into the full lock-up mode. Accordingly, when the decision at the step 52 or 53 is positive, the shift into the slip lock-up mode is required to prevent the direct shift from the torque converter mode to the full lock-up mode.

(3) The timer value To can be set to an optimum value which is not too long nor too short, by deriving same based on the instantaneous throttle angle, the vehicle speed and the gear position. Accordingly, it is possible to provide a required acceleration response corresponding to the depressing operation of the accelerator pedal, and simultaneously, it is also possible to provide the slip lock-up mode effectively between the torque converter mode and the full lock-up mode to attenuate the shock which is otherwise generated by the direct shift from the torque converter mode to the full lock-up mode.

It is to be understood that the invention is not to be limited to the preferred embodiment described above, and that various changes and modifications may be made without departing from the spirit and scope of the invention as defined in the appended claims.

For example, the timer value To may be derived solely by the speed of variation in the throttle valve angular position (dTH/dt) indicative of the accelrator operating speed or the vehicular acceleration demand magnitude.

What is claimed is:

1. A lock-up clutch control system for an automatic power transmission for an automotive vehicle, comprising:
   an input element;
   an output element in hydraulic drive connection with said input element;
   a lock-up clutch operatively arranged between said input element and said output element, said lock-up clutch being shiftable to operation in one of first, second and third modes, said lock-up clutch being applied to mechanically connect said input element with said output element during operation in said first mode and being released to mechanically disconnect said input element from said output element during operation in said second mode, said lock-up clutch being applied to establish a slippage mechanical connection of said input element with said output element during operation in said third mode such that a relative rotation is allowed between said input and output elements;
   means for detecting a power demand on the automotive vehicle and generating a power demand indicative signal indicative of said power demand detected;
   a control unit operatively connected with said lock-up clutch, said control unit including,
   first means for selecting one of said first, second and third modes based on preselected vehicular operating condition indicative parameters;
   second means for deriving a speed of variation in said power demand indicative signal and generating an acceleration demand magnitude when said third mode is selected by said first means, said acceleration demand magnitude being indicative of said speed of variation of said power demand indicative signal; and
   third means for executing said second mode in place of said third mode when said acceleration demand magnitude is not less than a predetermined value.

2. The lock-up clutch control system as set forth in claim 1, wherein said third mode is executed when said acceleration demand magnitude is less than said predetermined value.

3. The lock-up clutch control system as set forth in claim 1, wherein said execution of the second mode in place of said third mode continues until an instantaneous acceleration magnitude derived by said second means becomes less than said predetermined value.

4. The lock-up clutch control system as set forth in claim 3, wherein said third mode is executed when said instantaneous acceleration magnitude becomes less than said predetermined value.

5. The lock-up clutch control system as set forth in claim 1, wherein said execution of the second mode in place of said third mode continues until an instantaneous acceleration magnitude derived by said second means becomes less than said predetermined value after an elapse of a time, said time being derived based on a vehicular operating condition indicative parameter.

6. The lock-up clutch control system as set forth in claim 5, wherein said execution of the second mode in place of said third mode continues until said instantaneous acceleration magnitude becomes less than said predetermined value after the elapse of said time when a detected engine load is larger than a preset value and before the elapse of said time when the detected engine load is no more than said preset value.

7. The lock-up clutch control system as set forth in claim 5, wherein said execution of the second mode in place of said third mode continues until said instantaneous acceleration magnitude becomes less than said predetermined value after the elapse of said time when a detected vehicle speed is less than a preset value and before the elapse of said time when the detected vehicle speed is no less than the preset value.

8. The lock-up clutch control system as set forth in claim 1, wherein said relative rotation is caused by a slip generated between said input and output elements through said lock-up clutch.

9. The lock-up clutch control system as set forth in claim 8, wherein an amount of said slip is controllably maintained in a predetermined range through a feedback control during operation in said third mode.

10. The lock-up clutch control system as set forth in claim 1, wherein said power demand detected by said power demand detecting means and used by said second means to derive said acceleration demand magnitude is a throttle valve angular position.

11. The lock-up clutch control system as set forth in claim 10, wherein said acceleration demand magnitude is indicative of a speed of variation in said throttle valve angular position.

12. A lock-up clutch control system for an automatic power transmission comprising:
    an input element in drive connection with a prime mover;
    an output element in drive connection with said input element said output element being driven by said input element through working fluid;
    a lock-up clutch operatively arranged between said input element and said output element, said lock-up clutch being operated in one of first to third modes, said lock-up clutch being applied to fully connect said input element with said output element in said first mode and being released to fully disconnect said input element from said output element in said second mode and being applied to connect said input element with said output element in said third mode such that a relative rotation is allowed between said input and output elements;
    first means for selecting one of said first to third modes based on preselected vehicular operating condition indicative parameters;
    second means for deriving an acceleration demand magnitude when said third mode is selected by said first means;
    third means for executing said second mode in place of said third mode when said acceleration demand magnitude is no less than a predetermined value; and
    wherein said execution of the second mode in place of said third mode continues until said instantaneous acceleration magnitude becomes less than said predetermined value after the elapse of said time when a detected vehicle speed in less than a preset value and before the elapse of said time when the detected vehicle speed is no less than the preset value.

13. A lock-up clutch control system for an automatic power transmission comprising:
    an input element in drive connection with a prime mover;
    an output element in drive connection with said input element said output element being driven by said input element through working fluid;
    a lock-up clutch operatively arranged between said input element and said output element, said lock-up clutch being operated in one of first to third modes, said lock-up clutch being applied to fully connect said input element with said output element in said first mode and being released to fully disconnect said input element from said output element in said second mode and being applied to connect said input element with said output element in said third mode such that a relative rotation is allowed between said input and output elements;
    first means for selecting one of said first to third modes based on preselected vehicular operating condition indicative parameters;
    second means for deriving an acceleration demand magnitude when said third mode is selected by said first means;
    third means for executing said second mode in place of said third mode when said acceleration demand magnitude is no less than a predetermined value; and
    wherein said acceleration demand magnitude is indicative of a speed of variation in said throttle valve angular positions.

14. The lock-up clutch control system as set forth in claim 13, wherein said third mode is executed when said acceleration demand magnitude is less than said predetermined value.

15. The lock-up clutch control system as set forth in claim 13, wherein said execution of the second mode in place of said third mode continues until an instantaneous acceleration magnitude derived by said second means becomes less than said predetermined value.

16. The lock-up clutch control system as set forth in claim 13, wherein said third mode is executed when said instantaneous acceleration magnitude becomes less than said predetermined value.

17. The lock-up clutch control system as set forth in claim 13, wherein said execution of the second mode in place of said third mode continues until an instantaneous acceleration magnitude derived by said second means becomes less than said predetermined value after an elapse of a time, said time being derived based on a vehicular operating condition indicative parameter.

18. The lock-up clutch control system as set forth in claim 13, wherein said relative rotation is caused by a slip generated between said input and output elements through said lock-up clutch.

19. The lock-up clutch control system as set forth in claim 13, wherein an amount of said slip is controllably maintained in a predetermined range through a feedback control during operation in said third mode.

20. The lock-up clutch control system as set forth in claim 13, wherein said second means derives said acceleration demand magnitude based on detected throttle valve angular positions.

* * * * *